Figure 1:
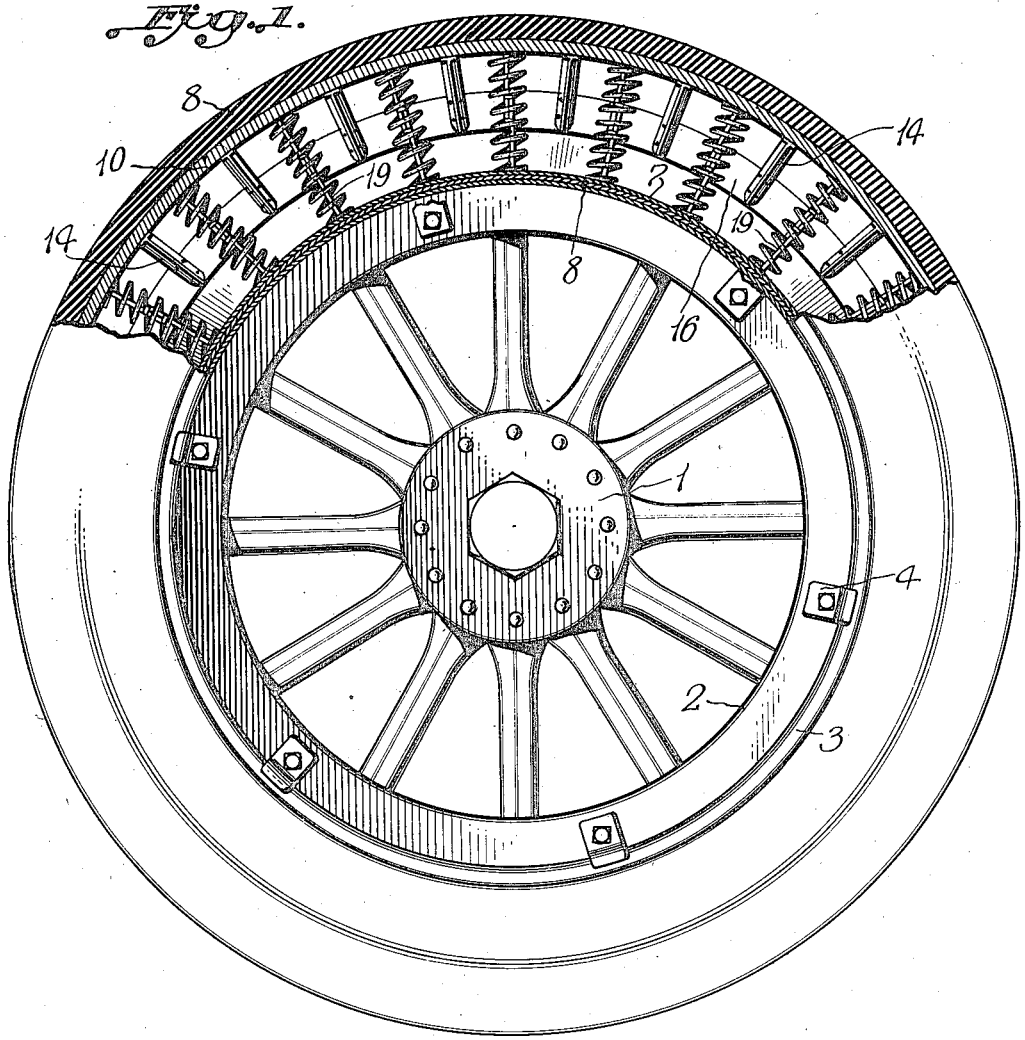

J. KUEHL.
RESILIENT WHEEL.
APPLICATION FILED MAR. 12, 1918.

1,293,808.

Patented Feb. 11, 1919.

INVENTOR
Joseph Kuehl,
BY
ATTORNEYS

UNITED STATES PATENT OFFICE.

JOSEPH KUEHL, OF DETROIT, MICHIGAN.

RESILIENT WHEEL.

1,293,808.

Specification of Letters Patent.

Patented Feb. 11, 1919.

Application filed March 12, 1918. Serial No. 221,886.

*To all whom it may concern:*

Be it known that I, JOSEPH KUEHL, a citizen of the United States of America, residing at Detroit, in the county of Wayne and State of Michigan, have invented certain new and useful Improvements in Resilient Wheels, of which the following is a specification, reference being had therein to the accompanying drawings.

This invention relates to a resilient wheel and tire that avoids the unreliability of the pneumatic tire while at the same time it provides a reasonable amount of resiliency.

This invention consists in the matters hereinafter set forth, and more particularly pointed out in the appended claims.

Figure 2:
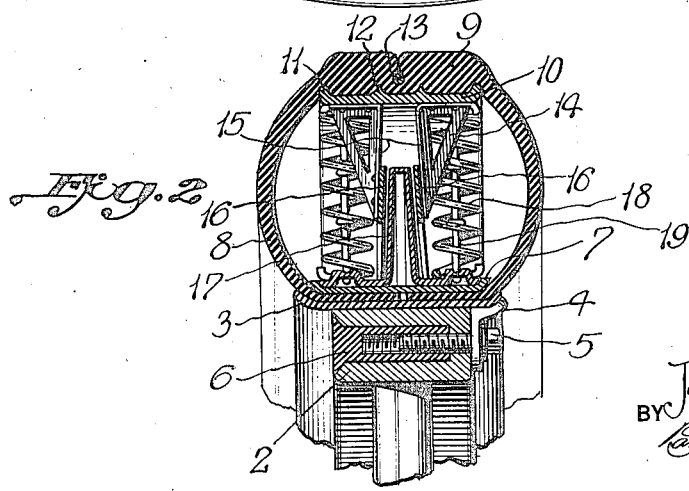

In the drawings,

Figure 1 is a view in side elevation, partially broken away and in section, of a wheel and tire embodying features of the invention; and Fig. 2 is a view in cross section thereto.

As herein shown in preferred form, the nave 1 of a wheel supports a felly 2 on which a demountable rim 3 is detachably secured by holding clips 4 that are in turn held by cap screws 5 entering bushings 6. Or other suitable means may be used.

An auxiliary rim 7 is adapted to close over and confine the inner marginal portions of a tire shoe 8 of flexible fabric, preferably of rubber or rubber composition, the outer tread portion 9 of which is locked around a tread rim 10 that has peripheral ribs 11 on its margins and inner ribs 12, a locking wire 13 in a recess of the shoe holding the latter in place.

A plurality of guide members 14 disposed in pairs, with the inner faces 15 thereof, in divergent relation, are secured to the inner face of the tread rim and are supports for a pair of inner spaced inwardly divergent guide rings 16. The latter play on a hollow guide rib 17 secured on the member 7, the divergent sides of the ribs 17 coacting with the similarly positioned faces of the rings 16, to act as a friction check for excessive inward movement at any point of the member 10 against the action of a series of radially disposed pairs of spiral springs 18 that are locked against lateral displacement by longitudinally collapsible keepers 19, the eyeleted ends 20 of which permit their telescopic movement.

As a result of this invention the wheel presents resiliency that absorbs the shocks of the body while the disadvantages of a pneumatic tire are avoided.

Obviously changes in the detail of construction may be made without departing from the spirit of the invention and I do not care to limit myself to any particular form or arrangement of parts.

What I claim is:—

1. In a resilient wheel, a rim mounted on the wheel felly, a peripheral guide rib on the rim having divergent sides, a tread rim, pairs of guide members on the inner face of the tread rim, a pair of guide rings secured by the guide members in divergent relation and on opposite sides of the guide rib against which they bear, and radially disposed spring members between the rims normally maintaining the parts in concentric relation.

2. The combination in a wheel, of a felly, a rim thereon, a tread rim concentric therewith, a hollow peripheral guide rib on the rim having divergent lateral faces, pairs of guide members extending radially inward from the inner surface of the tread rim, a pair of annular guide rings mounted on the guide members in spaced divergent relation to embrace the guide rib and pairs of radially disposed spring members in compression between the rims for securing the parts in concentric relation.

In testimony whereof I affix my signature in the presence of two witnesses.

JOSEPH KUEHL.

Witnesses:
KARL H. BUTLER,
ANNA M. DORR.